(No Model.)

W. F. McNUTT.
VEHICLE AXLE.

No. 365,144. Patented June 21, 1887.

Witnesses,
Geo. H. Strong.
J. L. Morse

Inventor,
Wm. F. McNutt
By Dewey & Co.
attys

UNITED STATES PATENT OFFICE.

WILLIAM F. McNUTT, OF SAN FRANCISCO, CALIFORNIA.

VEHICLE-AXLE.

SPECIFICATION forming part of Letters Patent No. 365,144, dated June 21, 1887.

Application filed November 17, 1886. Serial No. 219,194. (No model.)

*To all whom it may concern:*

Be it known that I, WILLIAM F. McNUTT, of the city and county of San Francisco, State of California, have invented an Improvement in Vehicle-Axles; and I hereby declare the following to be a full, clear, and exact description of the same.

My invention relates to certain improvements in vehicle-axles; and it consists in the employment of a supplemental removable shoulder or collar which receives the wear, and which may be replaced at simple expense when too much worn for further use.

Figure 1:
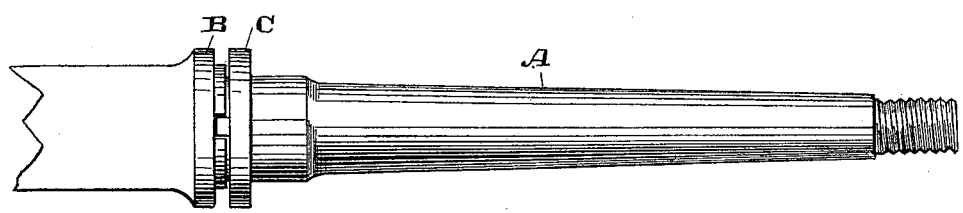
Figure 2:
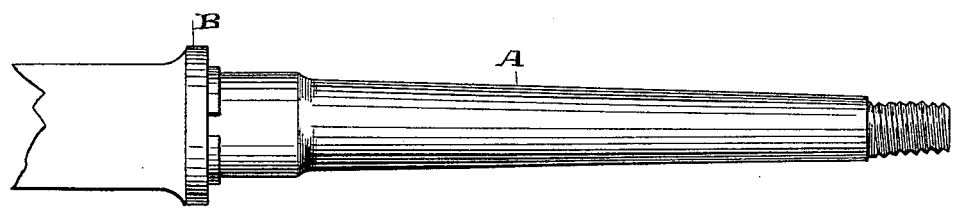
Figure 3:
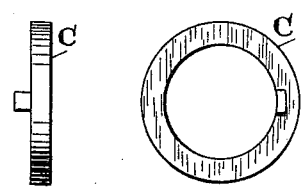

Referring to the accompanying drawings for a more complete explanation of my invention, Figure 1 is a view of the axle having my device applied. Fig. 2 shows the axle with the collar removed. Fig. 3 is an edge and plan view of the washer detached.

A is the bearing portion or spindle of a carriage axle, upon which the box fitted in the wheel-hub turns; and B is the shoulder or collar made upon the axle, and against which the inner end of the hub-box abuts. Between these two surfaces it is usual to place leather or other washers to take the wear from these parts; but still with the introduction of sand and foreign substances the wear upon the axle, shoulder, or collar is very considerable, and eventually allows the hub-box to move up the tapering spindle so far that it binds and is apt to become heated and set. When worn in this manner, the only method of repairing is to cut the spindle off and weld a new one upon the axle, which is expensive.

In my invention, C is a supplemental collar, which abuts against a similar narrow flange projecting from the shoulder-collar B, and having a slightly greater diameter than the axle itself at this point. In one of these flanges a depression or notch is made, and from the other a corresponding lug projects, so that when this collar is slipped upon the axle, which it fits pretty closely, the lug upon one flange will enter the depression in the socket in the other, and thus prevent the collar from being turned around. The outer face of this collar then forms a shoulder, against which the inner end of the hub-box will abut, and this supplemental collar then receives all the wear which would ordinarily come upon the fixed main shoulder or collar. The space or channel formed between these two shoulders serves to catch any dust or dirt which would work its way in from the inner end of the hub and will prevent its getting into the box and wearing or cutting the axle or spindle. This supplemental collar or shoulder is simply made by a drop-press or other well-known or convenient method, and may be slipped on or removed at any time when worn, thus saving the spindle upon which the wear is very inconsiderable. It is manifest that it might be fastened by screw or any other suitable or desirable means.

I am aware collars have been shrunk permanently upon the outside of the skein or axle; but the construction is objectionable, because the collar is immovably secured, and is subject to the end wear, which I avoid. I am further aware that washers located in an enlarged case or sleeve have been removably secured to allow the sleeve to slip farther on the axle toward the usual fixed collar. I am also aware elastic collars have been employed to take up end-play or rattle and used in conjunction with metal collars placed between the ends of the axle-box and the elastic collars. These constructions I do not broadly claim as my invention, but limit myself to the specific form shown, whereby a rigid solid collar is fixed firmly while in use, but readily removable when the wheel is off the axle.

My device is also applicable to any axle and box without material change, and when employed increases the lift of said parts almost indefinitely.

Having thus described my invention, what I claim as new, and desire to secure by Letters Patent, is—

An improved vehicle-axle having a fixed collar at its inner end provided with an integral notched flange, in combination with a supplemental collar having a projection extending at right angles therefrom and fitting the contiguous notched flange, said supplemental collar being immovably locked when in place and removable when the wheel has been taken off, as herein described.

In witness whereof I have hereunto set my hand.

WILLIAM F. McNUTT.

Witnesses:
S. H. NOURSE,
H. C. LEE.